(12) United States Patent
Olivan Bescos

(10) Patent No.: US 9,727,999 B2
(45) Date of Patent: Aug. 8, 2017

(54) VISUALIZATION OF FLOW PATTERNS

(75) Inventor: Javier Olivan Bescos, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 244 days.

(21) Appl. No.: 13/995,802

(22) PCT Filed: Dec. 5, 2011

(86) PCT No.: PCT/IB2011/055468
§ 371 (c)(1),
(2), (4) Date: Jun. 19, 2013

(87) PCT Pub. No.: WO2012/085720
PCT Pub. Date: Jun. 28, 2012

(65) Prior Publication Data
US 2013/0265302 A1   Oct. 10, 2013

(30) Foreign Application Priority Data

Dec. 22, 2010   (EP) ..................................... 10196398

(51) Int. Cl.
*G06T 19/20*   (2011.01)
*G06T 15/00*   (2011.01)
*G06T 15/08*   (2011.01)

(52) U.S. Cl.
CPC .............. *G06T 15/00* (2013.01); *G06T 15/08* (2013.01); *G06T 19/20* (2013.01); *G06T 2210/24* (2013.01); *G06T 2219/2012* (2013.01)

(58) Field of Classification Search
CPC . G06T 15/00; G06T 2219/2012; G06T 19/20; G06T 15/08; G06T 2210/24
See application file for complete search history.

(56) References Cited

U.S. PATENT DOCUMENTS 5,957,138 A    9/1999   Lin
7,123,766 B2 * 10/2006  Mao et al. .................... 382/154
                        (Continued)

FOREIGN PATENT DOCUMENTS

JP    2003330512 A   11/2003
JP      05066915 B2  11/2012

OTHER PUBLICATIONS

Pelt, Exploration of 4D MRI Blood-Flow Using Stylistic Visualization, Nov. 2010, IEEE Transacti Ons on Visualization and Computer Graphic, vol. 16, No. 6,1, pp. 1339-1347.*

(Continued)

*Primary Examiner* — Jacinta M Crawford
*Assistant Examiner* — Phuc Doan

(57) ABSTRACT

A system for visualizing a flow within a volume of a 3-dimensional (3-D) image includes a first transfer unit for applying a first transfer function, which assigns a renderable property to each location of a first plurality of locations within the volume based on a flow pattern assigned to the location. A second transfer unit is provided for applying a second transfer function, which assigns a renderable property to each location of a second plurality of locations within the volume based on a value of the 3-D image assigned to the location. Further, the system also includes a mixing unit for computing a 2-dimensional (2-D) image based on the renderable property assigned to each location of the first plurality of locations and on the renderable property assigned to each location of the second plurality of locations, where the 2-D image visualizes the flow pattern and the 3-D image.

14 Claims, 6 Drawing Sheets

(56) References Cited

U.S. PATENT DOCUMENTS

| 7,256,780 | B2 | 8/2007 | Williams et al. |
| 2006/0028480 | A1* | 2/2006 | Engel .................... G06T 15/08 345/582 |
| 2008/0269611 | A1 | 10/2008 | Pedrizzetti |
| 2009/0110252 | A1 | 4/2009 | Baumgart et al. |
| 2009/0303236 | A1* | 12/2009 | Buyanovskiy .......... G06T 15/08 345/426 |
| 2013/0265302 | A1 | 10/2013 | Olian |

OTHER PUBLICATIONS

Heiberg et al: "Three-dimensional flow characterization using vector pattern matching", IEEE Transactions on Visualization and Computer Graphics, vol. 9, No. 3, Jul. 1, 2003, pp. 313-319.*
Weinkauf, Curvature Measures of 3D Vector Fields and their Applications, Feb. 2002, Journal of WSCG 10(2).*
Wei, A Sketch-Based Interface for Classifying and Visualizing Vector Fields, Mar. 2010, Visualization Symposium (PacificVis), 2010 IEEE Pacific.*
Gammack, Flow in pipes with non-uniform curvature and torsion, J. Fluid Mech. (2001), vol. 433, pp. 357-382.*
Morales, Modeling of Free Surface Flow in a Helical Channel with Finite Pitch, J. of the Braz. Soc. of Mech. Sci. & Eng. 2007.*
Nguyen, Curvature and Torsion Estimators for 3D Curves, ISVC 2008, Part I, LNCS 5358, pp. 688-699.*
Lu, Exploring Vector Fields with Distribution-based Streamline Analysis, URL: http://web.cse.ohio-state.edu/~luke/papers/PacificVis_distribution.pdf, 2012, 8 pages included.*
Kim, H.J. et al "Developing computational Methods for Three-Dimensional Finite Element Simulations of Coronary Blook Flow" Finite Elements in Analysis and Design, vol. 46, 2010, pp. 514-525.
Van Pelt, Roy et al "Exploration of 4D MRI Blook-Flow Using Stylistic Visualization", IEEE Transactions on Visualization and Computer Graphics, vol. 16, No. 6, 2010, pp. 1339-1347.
Heiberg, Einar et al "Three-Dimensional Flow Characterization using Vector Pattern Matching", IEEE Transactions on Visualization and Computer Graphics, vol. 9, No. 3, 2003, pp. 313-319.
Fruehauf, Thomas "Raycasting Vector Fields" Proceedings of the 7th IEEE Visualization Conf. The Computer Society, 1996.
Kniss, Joe et al "Multidimensional Transfer Functions for Interactive Volume Rendering", IEEE Transactions on Visualization and Computer Graphics, vol. 8, No. 3, 2002. pp. 270-285.
Krueger, Jens et al "A Particle System for Interactive Visualization of 3D Flows" IEEE Transactions on Visualization and Computer Graphics, vol. 11, No. 6, 2005, pp. 744-756.
De Leeuw, Willem C. et al "A Probe for Local Flow Field Visualization", 1993 IEEE Conf. Visualization, pp. 39-45.
Hanson, Andrew J. "Quarternion Frame Approach to Streamline Visualization", IEEE Transactions on Visualization and Computer Graphics, vol. 1, No. 2, Jun. 1995, pp. 164-174.
Rautek, Peter et al "Semantic Layers for Illustrative Volume Rendering" EEE Transactions on Visualization and Computer Graphics, vol. 13, No. 6, 2007, pp. 1336-1343.
Ruetten, Markus et al "Analyzing Vortex Breakdown Flow Structures by Assignment of Colors to Tensor Invariants", IEEE Transactions on Visualization and Computer Graphics, vol. 12, No. 5, 2006, pp. 1189-1196.
Svakhine, Nikolai et al "Illustration and Photography Inspired Visualization of Flows and Volumes", 2005.
Crossno, Patricia et al "Case Study: Visualizing Ocean Currents with Color and Diethering", 2001 IEEE, pp. 37-41.
Koehn, Alexander et al "A GPU-Based Fiber Tracking Framework using Geometry Shaders", Proc. SPIE, vol. 7261, 2009.
Kim, Hyun Jin, "Three Dimensional Finite Element Modeling of Blood Flow in the Coronary Arteries", Standford University 2009.
Pelt, R van et al., "Exploration of 4D MRI Blood-Flow Using Stylistic Visualization", IEEE Transactions on Visualization and Computer Graphics, vol. 18, No. 6, Nov./Dec. 2010, p. 1339-1347.
Heiberg, E. et al., "Three-Dimensional Flow Characterization Using Vector Pattern Matching", IEEE Transactions on Vis;ualization and Computer Graphics, vol. 9, No. 9, Jul.-Sep. 2009, p. 313-319.
Morales, R..M., "Modeling of free Surface Flow in a Helical channel with Finite Pitch", Journal of the Brazilian Society of Mechanicai Sciences and Engineering, vol. 29, No. 4, 2007, pp. 345-353.
Gammack, D., "Flow in pipes with non-uniform curvature and torsion", Journal of Fluid Mechanics, vol. 433, 2001, pp. 366.

* cited by examiner

A
B

C
D

E
F

G
H

VISUALIZATION OF FLOW PATTERNS

FIELD OF THE INVENTION

The invention relates to visualizing 3-dimensional flow or vector field patterns. In particular, the invention relates to visualizing flow or vector field patterns on the basis of time-series of image data sets.

BACKGROUND OF THE INVENTION

Flow visualization is a topic that has received a lot of attention in the past. Many methods of visualizing flow data have been developed including, for example, direct streamline visualization (Alexander Köhn, Jan Klein, Florian Weiler, Heinz-Otto Peitgen, "A GPU-based Fiber Tracking Framework using Geometry Shaders", Proc. SPIE, Vol. 7261, 72611J, 2009), ray-casting streamlines (Thomas Frühauf, "Raycasting vector fields", IEEE Visualization Proceedings, 1996), or particle tracing (Jens Krüger, Peter Kipfer, Polina Kondratieva, Rüdiger Westermann, "A Particle System for Interactive Visualization of 3D Flows", IEEE Transactions On Visualization And Computer Graphics, Vol. 11, No. 6, 11, 2005). These methods generate geometrical primitives, such as points or paths, flow vector fields or particle paths, which can be visualized with conventional computer graphics techniques.

The main shortcoming of the current solutions is that they do not provide ways of intuitively visualizing specific flow patterns. Often, many different flow patterns are mixed in the same image, contributing to the user confusion, especially when the user is not familiar with the mathematics involved in the flow analysis.

SUMMARY OF THE INVENTION

It would be advantageous to have a system capable of intuitively visualizing flow patterns.

Thus, in an aspect, the invention provides a system for visualizing a flow within a volume of a 3-dimensional (3-D) image, the system comprising:
  a first transfer unit for applying a first transfer function, which assigns a renderable property to each location of a first plurality of locations within the volume, on the basis of a flow pattern assigned to said location;
  a second transfer unit for applying a second transfer function, which assigns a renderable property to each location of a second plurality of locations within the volume, on the basis of a value of the 3-D image assigned to said location; and
  a mixing unit for computing a 2-D image based on the renderable property assigned to each location of the first plurality of locations and on the renderable property assigned to each location of the second plurality of locations, wherein the 2-D image visualizes the flow pattern and the 3-D image.

The flow patterns assigned to each location of the first plurality of locations can be obtained, for example, from an input file. Alternatively, they can be derived from image data, in particular 4-D image data, by means of differential geometry using the gradient operator or the structure tensor operator, for example. The mixing unit can be adapted for computing a renderable property at each location of a third plurality of locations within the volume on the basis of the renderable property assigned to each location of the first and second plurality of locations, and for computing the 2-D image based on the renderable property computed at each location of the third plurality of locations using any suitable volume rendering technique known in the art, for example, the direct volume rendering technique. Alternatively, the system may be adapted for computing a first 2-D image based on the renderable property assigned to each location of the first plurality of locations and a second 2-D image based on the renderable property assigned to each location of the second plurality of locations, and for alternatingly displaying the first and second 2-D image or for merging the first and second 2-D image.

In an embodiment, the system further comprises a pattern unit for computing the flow pattern at each location of the first plurality of locations.

In an embodiment of the system, at each location of the first plurality of locations, the flow pattern is computed based on the curvature and/or torsion of a flow curve associated with the flow at said location. The curvature and torsion uniquely determine the curve geometry as they are invariant with respect to curve reparameterization.

In an embodiment of the system, the flow pattern assumes one of a finite number of patterns, also referred to as pattern classes. Using pattern classes helps the user to concentrate on flow patterns of interest, defined by ranges of curvature and torsion values, for example.

In an embodiment of the system, the renderable property assigned to each location of the first or second plurality of locations comprises a color and opacity or transparency.

In an embodiment, the system further comprises a user interface adapted for receiving a user input for defining the first and/or second transfer function. Hence, the user is able to define flow patterns and tissues of interest to be visualized in the 2-D image.

The skilled person will realize that the system of the invention can be used for visualizing a velocity vector field associated with the flow. This results from the fact that each flow described by flow curves defines a unique vector field and, vice versa, each vector field defines a unique flow described by flow curves.

In a further aspect, a workstation comprising the system of the invention is provided.

In a further aspect, an image acquisition apparatus comprising the system of the invention system is provided.

In a further aspect, a method of visualizing a flow within a volume of a 3-dimensional (3-D) image is provided, the method comprising:
  a first transfer step for applying a first transfer function, which assigns a renderable property to each location of a first plurality of locations within the volume, on the basis of a flow pattern assigned to said location;
  a second transfer step for applying a second transfer function, which assigns a renderable property to each location of a second plurality of locations within the volume, on the basis of a value of the 3-D image assigned to said location; and
  a mixing step for computing a 2-D image based on the renderable property assigned to each location of the first plurality of locations and on the renderable property assigned to each location of the second plurality of locations.

In an implementation, the method further comprises a pattern classification step for computing the flow pattern at each location of the first plurality of locations.

In an implementation of the method, at each location of the first plurality of locations, the flow pattern is computed based on the curvature and/or torsion of a flow curve associated with the flow at said location.

In a further aspect, the invention provides a computer program product to be loaded by a computer arrangement, comprising instructions for visualizing a flow within a volume of a 3-Dimensional (3-D) image, the computer arrangement comprising a processing unit and a memory, the computer program product, after being loaded, providing said processing unit with the capability to carry out steps of the method of the invention.

It will be appreciated by those skilled in the art that two or more of the above-mentioned embodiments, implementations, and/or aspects of the invention may be combined in any way deemed useful.

Modifications and variations of the system, of the workstation, of the image acquisition apparatus, of the method, and/or of the computer program product, which correspond to the described modifications and variations of the system or of the method, can be carried out by a person skilled in the art on the basis of the description.

The invention is defined in the independent claims. Advantageous embodiments are defined in the dependent claims.

BRIEF DESCRIPTION OF THE DRAWINGS

These and other aspects of the invention are apparent from and will be elucidated by means of implementations and embodiments described hereinafter and with reference to the accompanying drawings, wherein.

Identical reference numerals are used to denote similar parts throughout the Figures.

DETAILED DESCRIPTION OF EMBODIMENTS

Figure 1:
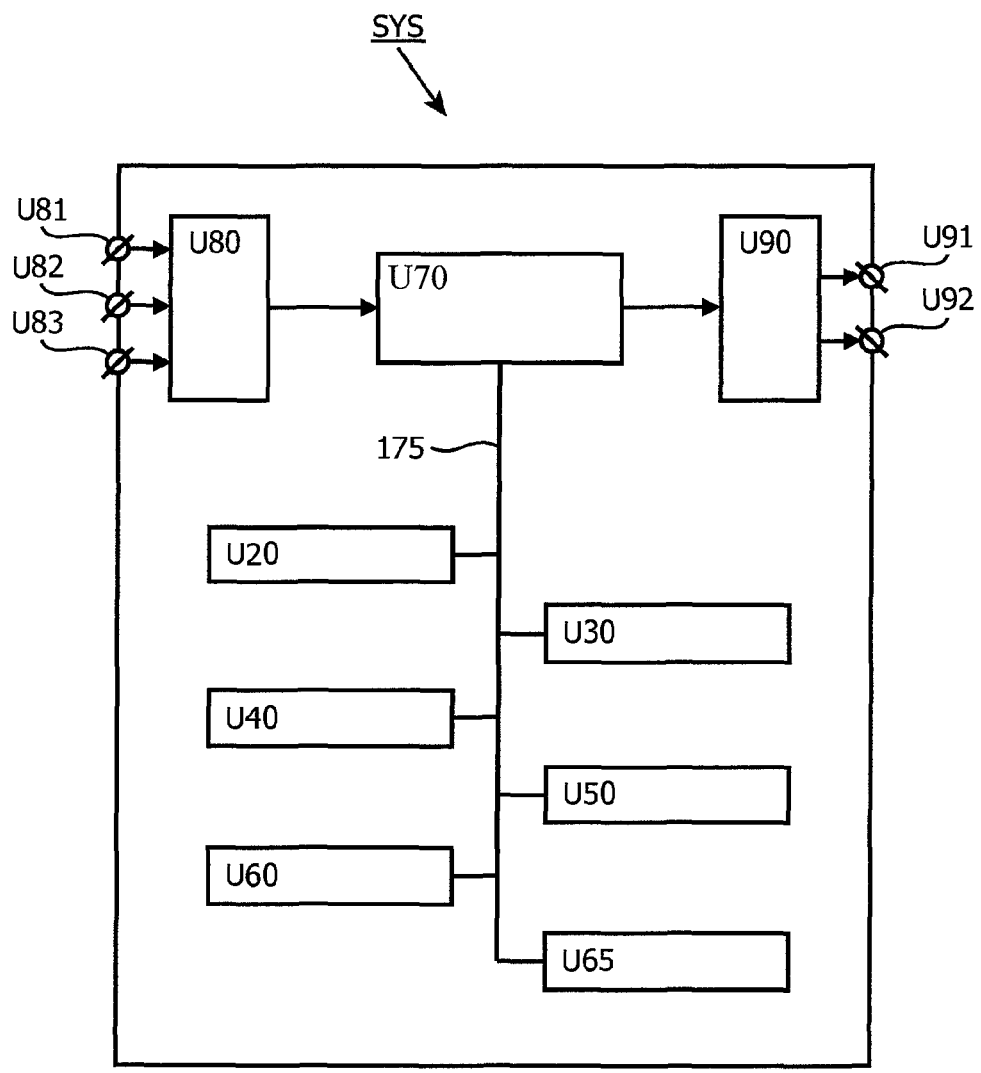
FIG. 1 shows a block diagram of an exemplary embodiment of the system.

FIG. 1 schematically shows a block diagram of an exemplary embodiment of the system SYS for visualizing a flow within a volume of a 3-Dimensional (3-D) image, the system comprising:
- a first transfer unit U30 for applying a first transfer function, which assigns a renderable property to each location of a first plurality of locations within the volume, on the basis of a flow pattern assigned to said location;
- a second transfer unit U40 for applying a second transfer function, which assigns a renderable property to each location of a second plurality of locations within the volume, on the basis of a value of the 3-D image assigned to said location; and
- a mixing unit U50 for computing a 2-D image based on the renderable property assigned to each location of the first plurality of locations and on the renderable property assigned to each location of the second plurality of locations.

The exemplary embodiment of the system SYS further comprises:
- a pattern unit U20 for computing the flow pattern at each location of the first plurality of locations;
- a control unit U60 for controlling the work of the system SYS;
- a user interface U65 for communication between the user and the system SYS; and
- a memory unit U70 for storing data.

In an embodiment of the system SYS, there are three input connectors U81, U82 and U83 for the incoming data. The first input connector U81 is arranged to receive data coming in from a data storage means such as, but not limited to, a hard disk, a magnetic tape, a flash memory, or an optical disk. The second input connector U82 is arranged to receive data coming in from a user input device such as, but not limited to, a mouse or a touch screen. The third input connector U83 is arranged to receive data coming in from a user input device such as a keyboard. The input connectors U81, U82 and U83 are connected to an input control unit U80.

In an embodiment of the system SYS, there are two output connectors U91 and U92 for the outgoing data. The first output connector U91 is arranged to output the data to a data storage means such as a hard disk, a magnetic tape, a flash memory, or an optical disk. The second output connector U92 is arranged to output the data to a display device. The output connectors U91 and U92 receive the respective data via an output control unit U90.

A person skilled in the art will understand that there are many ways to connect input devices to the input connectors U81, U82 and U83 and the output devices to the output connectors U91 and U92 of the system SYS. These ways comprise, but are not limited to, a wired and a wireless connection, a digital network such as, but not limited to, a Local Area Network (LAN) and a Wide Area Network (WAN), the Internet, a digital telephone network, and an analog telephone network.

In an embodiment, the system SYS comprises a memory unit U70. The system SYS is arranged to receive input data from external devices via any of the input connectors U81, U82, and U83 and to store the received input data in the memory unit U70. Loading the input data into the memory unit U70 allows quick access to relevant data portions by the units of the system SYS. The input data comprises the 3-D image. Optionally, the input data may comprise user input for defining the first and/or second transfer function, for example. The memory unit U70 may be implemented by devices such as, but not limited to, a register file of a CPU, a cache memory, a Random Access Memory (RAM) chip, a Read Only Memory (ROM) chip, and/or a hard disk drive and a hard disk. The memory unit U70 may be further arranged to store the output data. The output data comprises the 2-D image visualizing the flow patterns of interest. The memory unit U70 may be also arranged to receive data from and/or deliver data to the units of the system SYS comprising the pattern unit U20, the first transfer unit U30, the second transfer unit U40, the mixing unit U50, the control unit U60, and the user interface U65, via a memory bus U75. The memory unit U70 is further arranged to make the output data available to external devices via any of the output connectors U91 and U92. Storing data from the units of the system SYS in the memory unit U70 may advantageously improve performance of the units of the system SYS as well as the rate of transfer of the output data from the units of the system SYS to external devices.

In an embodiment, the system SYS comprises a control unit U60 for controlling the system SYS. The control unit U60 may be arranged to receive control data from and provide control data to the units of the system SYS. For example, after computing the flow patterns at the first plurality of locations within the volume, the pattern unit U20 may be arranged to provide control data "the flow patterns are computed" to the control unit U60, and the control unit U60 may be arranged to provide control data "use the first transfer function to compute the renderable property at the first plurality of locations within the volume", to the first transfer unit U30. Alternatively, control functions may be implemented in other units of the system SYS.

In an embodiment of the system SYS, the system SYS comprises a user interface U65 for enabling communication between a user and the system SYS. The user interface U65 may be arranged to receive a user input comprising the name of the file comprising the 3-D image data and the name of the file comprising the flow patterns at each location of the first plurality of locations within the volume. Optionally, the user interface may receive a user input for selecting a mode of operation of the system such as, for example, for selecting or modifying the first and/or second transfer function. The user interface may be further arranged to display the 2-D image. A person skilled in the art will understand that more functions may be advantageously implemented in the user interface U65 of the system SYS.

The system SYS may be arranged for receiving the first and/or second plurality of locations within the volume. Alternatively, the system SYS may be arranged to define the first and/or second plurality of locations. The first and/or second plurality of locations within the volume may be substantially identical to the plurality of voxels substantially comprised in the volume. Alternatively, the first and/or second plurality of locations within the volume may comprise a subset of voxels substantially comprised in the volume. The system SYS can be further arranged for computing the renderable property at each voxel within the volume, i.e. at each location of an exemplary third plurality of locations, on the basis of the value of the renderable property at each location of the first and/or second plurality of locations, using, for example, interpolation or regression techniques.

The skilled person will know many methods of defining the plurality of locations within the volume and computing uncertainties. The scope of the claims should not be construed limited to using any specific method.

In an embodiment, the system SYS comprises a pattern unit U20 for computing the flow pattern at each location of the first plurality of locations, which first plurality of locations comprises locations of all voxels, e.g., of voxel centers, within the volume of the 3-D image. The flow is described by the vector field uniquely defined by the flow. The vector field defines a flow field vector for every voxel within the volume. In medicine, the blood flow field vectors can be computed from blood flow measured using ultrasound Doppler vector tomography, MR tomography or PET. Alternatively, the blood flow in the heart or blood vessel trees can be simulated using blood flow models (see for example *Three-dimensional finite element modeling of blood flow in the coronary arteries*, PhD Thesis by Kim, Hyun Jin, STANFORD UNIVERSITY, 2009). Once the flow vector field is obtained, for each voxel, the curvature and torsion of the flow curve crossing the center of the voxel is calculated. The calculated values of curvature and torsion are used to define flow pattern classes.

Alternatively, the system SYS may be arranged to receive an input comprising a descriptor of the flow pattern (e.g., curvature and torsion) at each location of the first plurality of locations.

Figure 2:
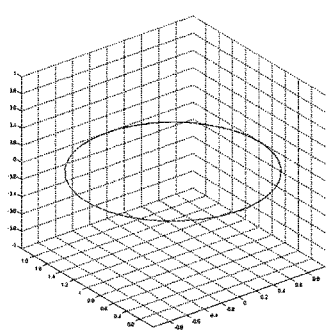
FIG. 2 shows eight exemplary flow curves, each flow curve representing a different flow pattern class.
Figure 2:
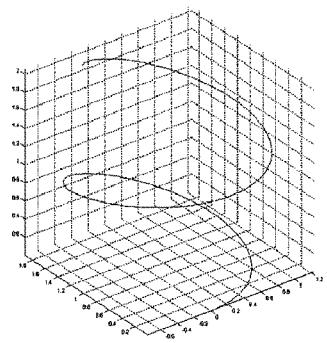
Figure 2:
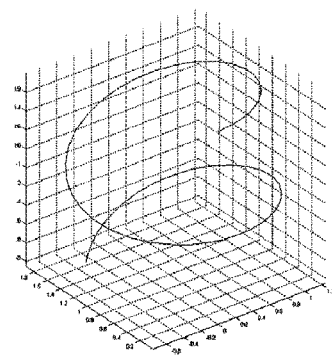
Figure 2:
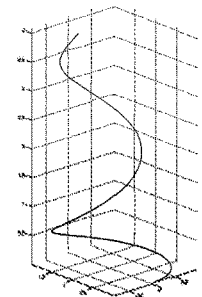
Figure 2:
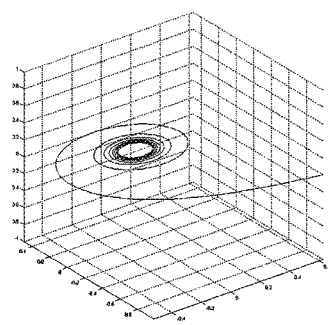
Figure 2:
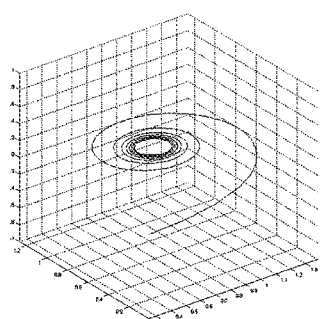
Figure 2:
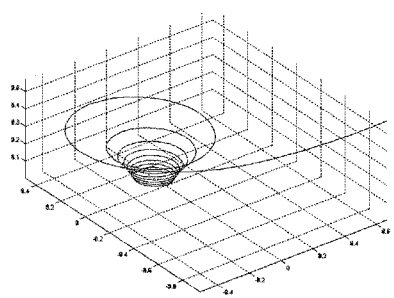
Figure 2:
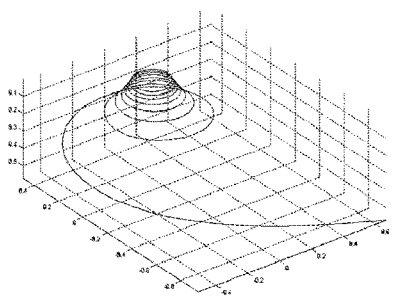

In an embodiment, the flow pattern classes are defined on the basis of the curvature and torsion values. The following nine flow pattern classes may be used, where FIG. 2 illustrates exemplary flow pattern classes A through H:

A: constant curvature, zero torsion (flow curves are circles);
B: constant positive curvature, constant non-zero torsion (flow curves are spirals of constant radius)
C: constant negative curvature, constant non-zero torsion (flow curves are spirals of constant radius, inverted with respect to the spirals in B);
D: constant curvature, variable torsion (the spiral flow "accelerates" in the z axis);
E: increasing curvature, zero torsion (flow in one plane, but converging towards a point);
F: decreasing curvature, zero torsion (flow in one plane, but diverging from a point);
G: increasing curvature, non-zero torsion (flow curves are spirals of varying radius);
H: decreasing curvature, non-zero torsion (flow curves are spirals of varying radius); and
I: any other curvature and torsion.

Figure 3:
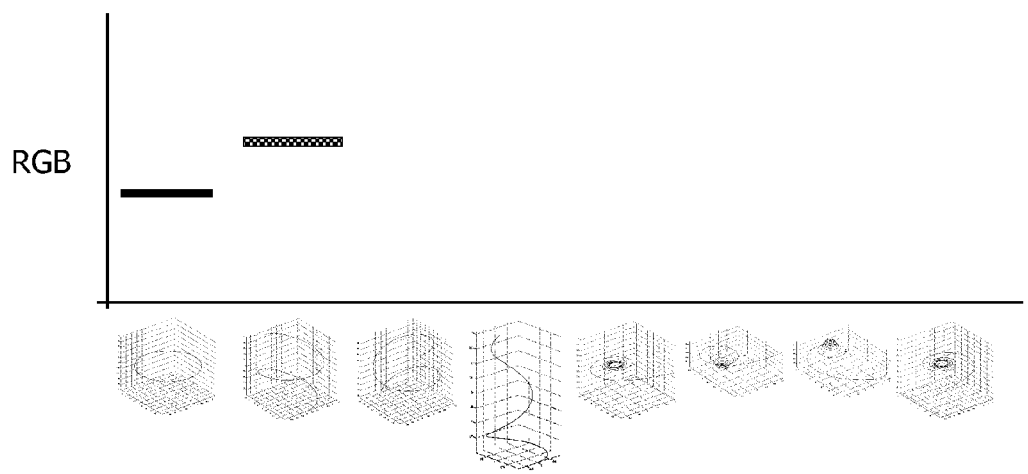
FIG. 3 illustrates an exemplary first transfer function assigning colors to the flow pattern classes.

Each class is assigned renderable properties by means of a first transfer function, also referred to as flow pattern transfer function. FIG. 3 illustrates such an exemplary flow pattern transfer function. Using RGB color coding with 256 color values, the function assigns the green color (0, 255, 0), to class A, the aqua color (0, 255, 255) to class B, and (0, 0, 0) to every other class. Further, the function assigns opacity 100% to the two classes A and B, and opacity 0% to every other class. Thus, the flow pattern transfer function will show visualized flow patterns of class A and B and will not show flow patterns of any other class. By redefining the transfer functions other flow pattern classes can be displayed.

Alternatively, the flow pattern transfer function may continuously map curvature values $k \in [k_1, k_2]$ into the green color values (0, C(k), 0) and the opacity value of 100% and/or torsion values $t \in [t_1, t_2]$ into the blue color values (0, 0, T(k)) and the opacity value of 100%, wherein $k_1 = k_2$, $k_1 < k_2$, and $t_1$, $t_2$, $t_1 < t_2$, denote the ends of the intervals of curvature and torsion values for visualization, and 100% denotes the opacity. If $k \notin [k_1, k_2]$ or $t \notin [t_1, t_2]$, the color values (0, 0, 0) and the opacity value of 0 is assigned by the flow pattern transfer function to such a pair (k, t). Alternatively, the opacity of the flow pattern may be linearly dependent on the magnitude image gradient vector at the first plurality of locations. Image gradient vectors are computed based on the scalar field defined by image intensities within the 3-D image volume. In that case, the flow patterns would be visible only at the edges of structures within the 3D volume, e.g. at the edges of blood vessels, and not outside or inside the structures because outside or inside the structures, the gradient is close to zero, and thus the opacity of the corresponding flow pattern is also close to zero. The skilled person will know other ways of defining the flow pattern transfer function useful for the system SYS of the invention.

The second transfer unit U40 is arranged for computing a renderable property at each location of a second plurality of locations within the volume of the 3-D image. The renderable property is computed by means of a second transfer function, also referred to as the image transfer function, on the basis of the value of the 3-D image assigned to said location. If the set of voxels and the second plurality of locations are different, the values of the renderable property computed at each location of the second plurality of locations are used for deriving the renderable property at each voxel of the 3-D image using, for example, interpolation or regression techniques. The skilled person will know how to construct and/or where to find other transfer functions suitable for computing a renderable property at each location of the second plurality of locations within the volume of the 3-D image. Such exemplary transfer functions can be found, for example, in *Multidimensional Transfer Functions for Interactive Volume Rendering* by Joe Kniss et al., IEEE Transactions on Visualization and Computer Graphics, Vol. 8, No. 3, July-September 2002, pages 270-285.

Direct volume rendering (DVR) using the renderable properties computed by the flow pattern and image transfer functions is applied to compute the final 2-D image for displaying on a display. The skilled person will know how to implement DVR. A summary of DVR can be found, for example in a PowerPoint presentation available at http.//www.cse.ohio-state.edu/~hwshen/788/volume.ppt.

In one embodiment, the mixing unit U50 of the system SYS may be adapted for computing a first 2-D image based on the renderable property resulting from the flow pattern at each voxel and a second 2-D image based on the renderable property resulting from the image value at each voxel. The first and second 2-D images may be merged with each other using, for example, 2-D image blending. Alternatively, the first and second 2-D image may be alternatingly displayed for a predetermined period of time, for example, a period between 0.1 and 1.0 seconds. This embodiment is particularly useful for illustrating uncertainties of temporal sequences of images.

In an embodiment, the renderable property computed using the flow pattern transfer function and the renderable property computed using the image transfer function are blended at each voxel. DVR is then used to compute the 2-D image based on the resulting blended renderable properties.

Figure 4:
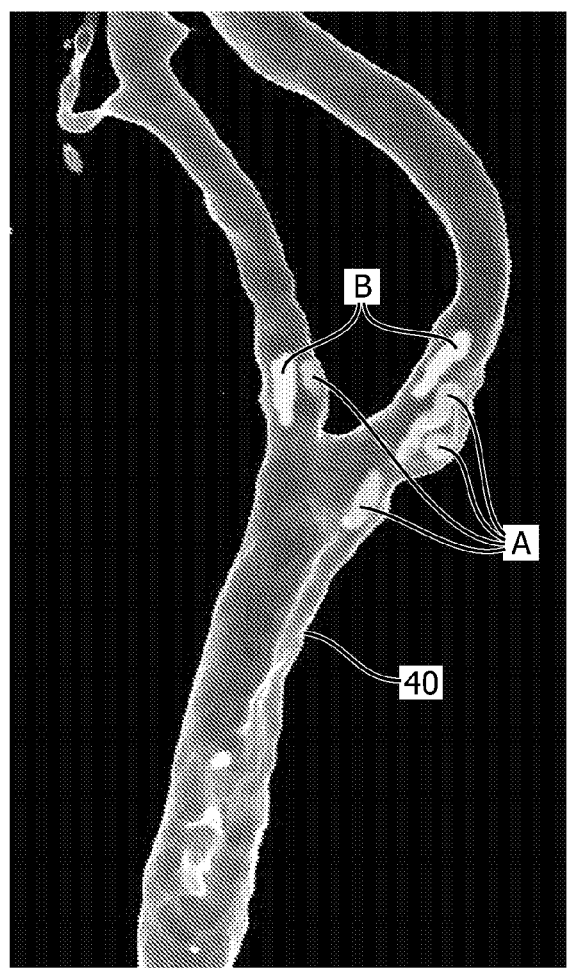
FIG. 4 shows a 2-D image computed by the system according to the invention.

In an embodiment, the 3-D array comprising voxel coordinates and the corresponding renderable property computed using the flow pattern transfer function, and the 3-D array comprising voxel coordinates and the corresponding renderable property computed using the image transfer function are merged by adding the corresponding renderable property values. DVR is then used to compute the 2-D image based on the resulting renderable properties. FIG. 4 shows a 2-D image computed by the system SYS using this method. The flow pattern classes shown in FIG. 2 and the flow pattern transfer function illustrated in FIG. 3 and described above are used to compute the 2-D image. The orange surface is rendered with conventional volume rendering applied to an anatomical MRI data set of the carotid bifurcation 40. This image adds important anatomical context to the flow pattern visualization. The flow pattern volume rendering according to an embodiment of the system SYS yields a set of cloud-shape images depicted in blue (class A) and green (class B).

A person skilled in the art will appreciate that the system of the invention may be a valuable tool for assisting a physician in many aspects of her/his job. Further, although the embodiments of the system are illustrated using medical applications of the system, non-medical applications of the system are also contemplated.

Those skilled in the art will further understand that other embodiments of the system SYS are also possible. It is possible, among other things, to redefine the units of the system and to redistribute their functions. Although the described embodiments apply to medical images, other applications of the system, not related to medical applications, are also possible.

The units of the system SYS may be implemented using a processor. Normally, their functions are performed under the control of a software program product. During execution, the software program product is normally loaded into a memory, like a RAM, and executed from there. The program may be loaded from a background memory, such as a ROM, hard disk, or magnetic and/or optical storage, or may be loaded via a network like the Internet. Optionally, an application-specific integrated circuit may provide the described functionality.

Figure 5:
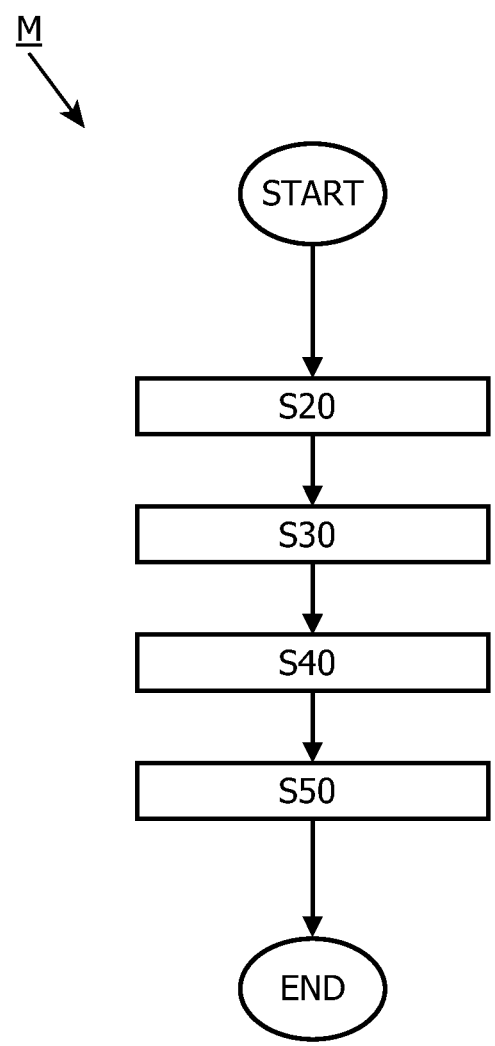
FIG. 5 schematically shows an exemplary flowchart of the method.

FIG. 5 shows an exemplary flowchart of the method M of visualizing a flow within a volume of a 3-Dimensional (3-D) image. The method M begins with a pattern step S20 for computing the flow pattern at each location of the first plurality of locations. After the pattern step S20, the method M continues to a first transfer step S30 for applying a first transfer function, which assigns a renderable property to each location of a first plurality of locations within the volume, on the basis of a flow pattern assigned to said location, and to a second transfer step S40 for applying a second transfer function, which assigns a renderable property to each location of a second plurality of locations within the volume, on the basis of a value of the 3-D image assigned to said location. The first and second transfer steps can be carried out independently of each other, concurrently or in any other order. After the two transfer steps S30 and S40, the method M continues to a mixing step S50 for computing a 2-D image based on the renderable property assigned to each location of the first plurality of locations and on the renderable property assigned to each location of the second plurality of locations. After computing the 2-D image, the method terminates.

A person skilled in the art may change the order of some steps, add some optional steps (e.g. a step for interactively determining the first and/or second transfer function) or perform some steps concurrently using threading models, multi-processor systems or multiple processes without departing from the concept as intended by the present invention. Optionally, two or more steps of the method M may be combined into one step. Optionally, a step of the method M may be split into a plurality of steps.

Figure 6:
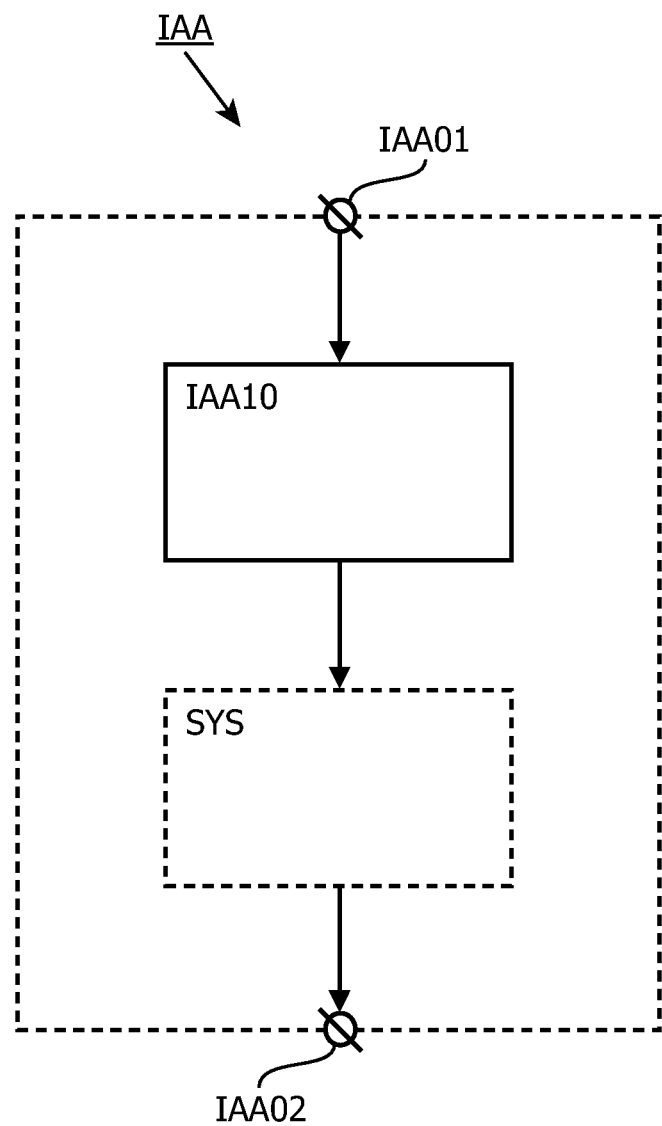
FIG. 6 schematically shows an exemplary embodiment of the image acquisition apparatus.

FIG. 6 schematically shows an exemplary embodiment of the image acquisition apparatus IAA employing the system SYS of the invention, said image acquisition apparatus IAA comprising an image acquisition unit IAA10 connected via an internal connection with the system SYS, an input connector IAA01, and an output connector IAA02. This arrangement advantageously increases the capabilities of the image acquisition apparatus IAA, providing said image acquisition apparatus IAA with advantageous capabilities of the system SYS.

Figure 7:
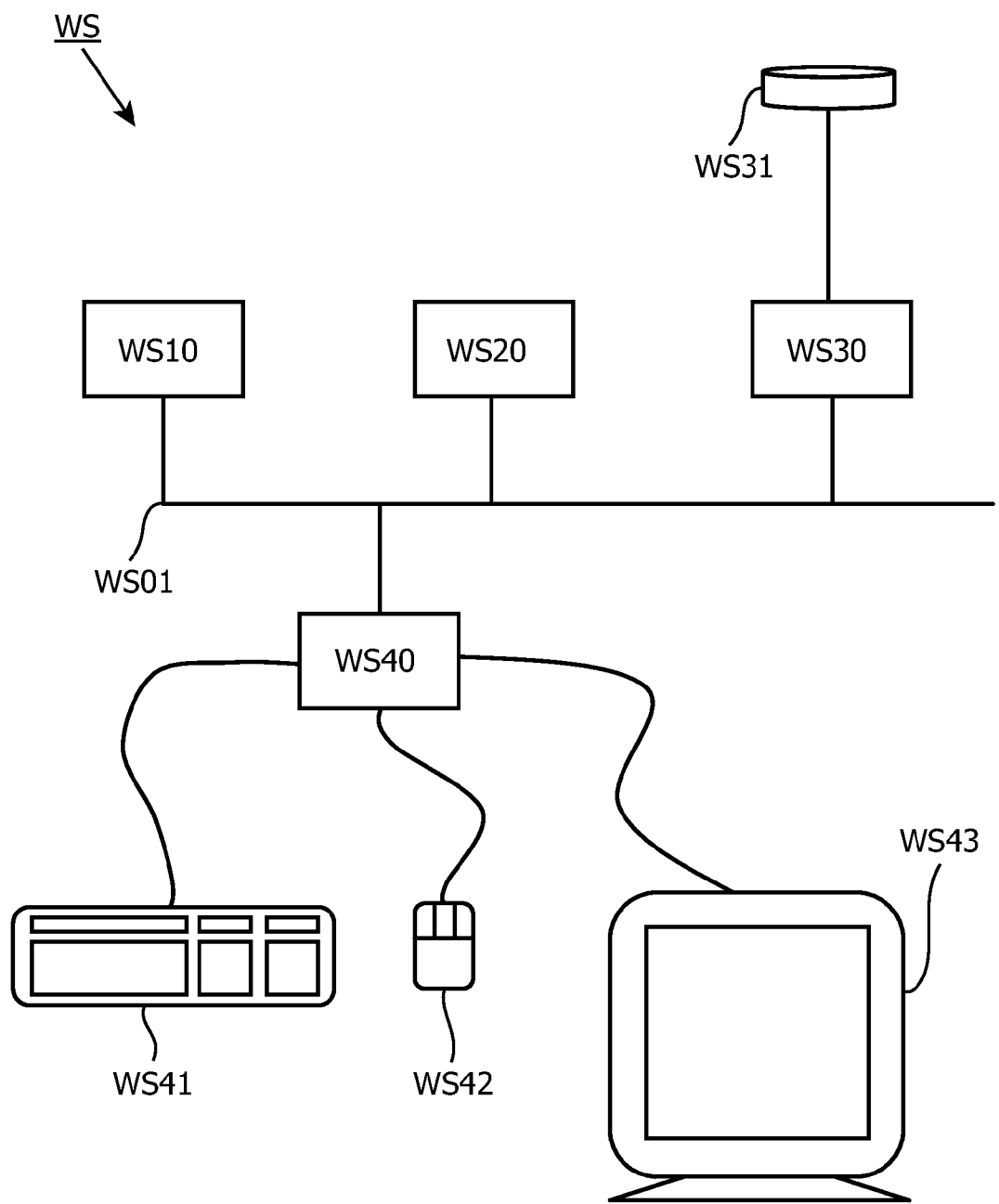
FIG. 7 schematically shows an exemplary embodiment of the workstation.

FIG. 7 schematically shows an exemplary embodiment of the workstation WS. The workstation comprises a system bus WS01. A processor WS10, a memory WS20, a disk input/output (I/O) adapter WS30, and a user interface WS40 are operatively connected to the system bus WS01. A disk storage device WS31 is operatively coupled to the disk I/O adapter WS30. A keyboard WS41, a mouse WS42, and a display WS43 are operatively coupled to the user interface WS40. The system SYS of the invention, implemented as a computer program, is stored in the disk storage device WS31. The workstation WS00 is arranged to load the program and input data into memory WS20 and execute the program on the processor WS10. The user can input information to the workstation WS00, using the keyboard WS41 and/or the mouse WS42. The workstation is arranged to output information to the display device WS43 and/or to the disk WS31. A person skilled in the art will understand that there are numerous other embodiments of the workstation WS known in the art and that the present embodiment serves the purpose of illustrating the invention and must not be interpreted as limiting the invention to this particular embodiment.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. The invention can be implemented by means of hardware comprising several distinct elements and by means of a programmed computer. In the system claims enumerating several units, several of these units can be embodied by one and the same record of hardware or software. The usage of the words first, second, third, etc., does not indicate any ordering. These words are to be interpreted as names.

The invention claimed is:

1. A system for visualizing a flow within a volume of a 3-dimensional (3-D) image, the system comprising:
   a first transfer unit configured to apply a first transfer function, wherein the first transfer function assigns a renderable property to each location of a first plurality of locations within the volume of the 3-D image based on a flow pattern class assigned to each location of the first plurality of locations, the flow pattern class being assigned from a plurality of flow pattern classes for classifying the flow at each location of the first plurality of locations;
   a second transfer unit configured to apply a second transfer function, wherein the second transfer function assigns a renderable property to each location of a second plurality of locations within the volume of the 3-D image based on a value of the 3-D image assigned to each location of the second plurality of locations; and
   a mixing unit configured to compute a first 2-dimensional (2-D) image based on the renderable property assigned to each location of the first plurality of locations and a second 2-D image based on the renderable property assigned to each location of the second plurality of location, the mixing unit being configured to compute the first 2-D image and the second 2-D image for displaying on a display by rendering using the renderable properties assigned by the first and second transfer functions, the mixing unit being further configured to display the first and second 2-D images alternatingly for a predetermined period of time,
   wherein the plurality of flow pattern classes are defined by ranges of curvature and torsion values, each of the plurality of flow pattern classes having a different range of curvature and torsion values, and
   wherein the flow pattern class assigned to each location of the first plurality of locations is assigned directly based on curvature and torsion values calculated for each location of the first plurality of locations.

2. The system of claim 1, wherein the mixing unit is further configured to compute a renderable property at each location of a third plurality of locations within the volume based on the renderable property assigned to each location of the first and second plurality of locations, and wherein the mixing unit is further configured to compute at least one of the first 2-D image and the second 2-D image based on the renderable property computed at each location of the third plurality of locations.

3. The system of claim 1, further comprising a pattern classification unit configured to compute the flow pattern class at each location of the first plurality of locations.

4. The system of claim 1, wherein the renderable property assigned to each location of the first or second locations comprises a color and at least one of an opacity and transparency.

5. The system of claim 1, further comprising a user interface configured to receive a user input for defining at least one of the first and second transfer function.

6. The system of claim 1, wherein the first transfer unit is configured to apply the first transfer function independently of the second transfer function applied by the second transfer unit.

7. The system of claim 1, wherein the first transfer unit is configured to apply the first transfer function concurrently with the second transfer function applied by the second transfer unit.

8. The system of claim 1, wherein the mixing unit is further configured to blend the renderable property assigned to each location of the first plurality of locations with the renderable property assigned to each location of the second plurality of locations resulting in blended renderable properties, and wherein direct volume rendering is used to compute the 2-D image based on the blended renderable properties.

9. The system of claim 1, wherein the renderable property assigned to each location of the first plurality of locations within the volume of the 3-D image and the renderable property assigned to each location of the second plurality of locations within the volume of the 3-D image are merged together by the mixing unit by adding corresponding renderable properties of the first and second plurality of locations resulting in resulting renderable properties, and wherein the mixing unit is configured to compute at least one of the first 2-D image and the second 2-D image based on the resulting renderable properties.

10. A workstation comprising a system as claimed in claim 1.

11. An image acquisition apparatus comprising a system as claimed in claim 1.

12. A method of visualizing a flow within a volume of a 3-dimensional (3-D) image, the method comprising acts of:
   applying a first transfer function by a first transfer unit, wherein the first transfer function assigns a renderable property to each location of a first plurality of locations within the volume of the 3-D image based on a flow pattern class assigned to each location of the first plurality of locations, the flow pattern class being assigned from a plurality of flow pattern classes for classifying the flow at each location of the first plurality of locations;
   applying a second transfer function by a second transfer unit, wherein the second transfer function assigns a renderable property to each location of a second plurality of locations within the volume of the 3-D image based on a value of the 3-D image assigned to each location of the second plurality of locations; and
   computing a by a mixing unit first 2-dimensional (2-D) image based on the renderable property assigned to each location of the first plurality of locations and a second 2-D image based on the renderable property assigned to each location of the second plurality of locations, the mixing unit being configured to compute the first 2-D image and the second 2-D image for displaying on a display by rendering using the renderable properties assigned by the first and second transfer functions, the mixing unit being further configured to display the first and second 2-D images alternatingly for a predetermined period of time, wherein the plurality of flow pattern classes are defined by ranges of curvature and torsion values, each of the plurality of flow pattern classes having a different range of curvature and torsion values, and wherein the flow pattern class assigned to each location of the first plurality of locations is assigned directly based on curvature and torsion values calculated for each location of the first plurality of locations.

13. The method of claim 12, further comprising an act of computing the flow pattern class at each location of the first plurality of locations by a pattern classification unit.

14. A non-transitory computer readable medium comprising computer instructions which, when executed by a processor, configure the processor to perform a method of visualizing a flow within a volume of a 3-dimensional (3-D) image by performing acts of:

causing application of a first transfer function by a first transfer unit; wherein the first transfer function assigns a renderable property to each location of a first plurality of locations within the volume of the 3-D image based on a flow pattern class assigned to each location of the first plurality of locations, the flow pattern class being assigned from a plurality of flow pattern classes for classifying the flow at each location of the first plurality of locations;

causing application of a second transfer function by a second transfer unit, wherein the second transfer function assigns a renderable property to each location of a second plurality of locations within the volume of the 3-D image based on a value of the 3-D image assigned to each location of the second plurality of locations; and causing computation of a first 2-dimensional (2-D) image based on the renderable property assigned to each location of the first plurality of locations and a second 2-D image based on the renderable property assigned to each location of the second plurality of locations;

causing a display to display the first 2-D image and the second 2-D image by rendering using the renderable properties assigned by the first and second transfer functions, and to display the first and second 2-D images alternately for predetermined period of time, wherein the plurality of flow pattern classes are defined by ranges of curvature and torsion values, each of the plurality of flow pattern classes having a different range of curvature and torsion values, and wherein the flow pattern class assigned to each location of the first plurality of locations is assigned directly based on curvature and torsion values calculated for each location of the first plurality of locations.

* * * * *